United States Patent

[11] 3,630,711

| [72] | Inventors | George M. Burkert<br>Shelby, N.C.;<br>John D. Nickerson, Atlanta, Ga. |
|---|---|---|
| [21] | Appl. No. | 51,345 |
| [22] | Filed | June 30, 1970 |
| [45] | Patented | Dec. 28, 1971 |
| [73] | Assignee | United States Steel Corporation<br>Continuation-in-part of application Ser. No. 791,522, Jan. 15, 1969, now abandoned, which is a continuation-in-part of application Ser. No. 470,909, July 9, 1965, now abandoned. This application June 30, 1970, Ser. No. 51,345 |

[54] CLARIFICATION OF AMMONIUM POLYPHOSPHATE SOLUTIONS
6 Claims, No Drawings

[52] U.S. Cl. .................................................. 71/34, 23/107
[51] Int. Cl. .................................................. C05b 7/00, C01b 25/28
[50] Field of Search ................................... 71/34, 64 C, 41, 33; 23/107, 165 B; 210/44, 54

[56] References Cited
UNITED STATES PATENTS
3,129,170 4/1964 Ittlinger .................... 210/54

*Primary Examiner*—Reuben Friedman
*Assistant Examiner*—Richard Barnes
*Attorney*—Gene Harsh

ABSTRACT: Carbonaceous chars resulting from organic matter present in wet process phosphoric acid and generated during the concentration thereof are removed from ammonium polyphosphate solutions by adding an aliphatic organic amine compound to the polyphosphate solution, agitating the mixture and holding the solution until the solids flocculate and float as a froth to the surface, permitting removal of the solids with the froth.

CLARIFICATION OF AMMONIUM POLYPHOSPHATE SOLUTIONS

This application is a continuation-in-part of copending application, Ser. No. 791,522, filed Jan. 15, 1969, and now abandoned which in turn is a continuation-in-part of abandoned application, Ser. No. 470,909, filed July 9, 1965.

BACKGROUND OF THE INVENTION

This invention relates to the clarification of ammonium polyphosphate solutions, and more particularly, to the flotation of carbonaceous chars from ammonium polyphosphate solutions containing 10 to 80 percent by weight of the total $P_2O_5$ as nonorthophosphate where the polyphosphate solution is produced from wet process phosphoric acid.

In conventional methods for the preparation of phosphoric acid, the reaction product of phosphate rock and sulfuric acid is filtered and the calcium sulfate filter cake water washed to yield a crude aqueous acidic phosphatic solution. This wet process acid normally contains 30 to 32% $P_2O_5$ and is normally concentrated to 52 to 54% $P_2O_5$ before shipment (merchant-grade acid).

Wet process acid is a very impure product which contains small amounts of a wide variety of materials originating in the phosphate rock. Compounds of iron, calcium, aluminum and fluorine and organic matter are the most common impurities. Part of these impurities are in solid form and result from imperfect filtration, from precipitation during concentration, or from post-precipitation. Other impurities remain in solution.

Concentrated efforts by the workers in the art have led to several processes which, although not completely successful, produce a clarified product which is commercially acceptable for many purposes. Filtering through a sintered glass disc is one means of clarification. Another is the process of U.S. Pat. No. 3,129,170 to Ittlinger which teaches the addition of amine clarification agents to merchant-grade phosphoric acid to increase the settling rate of suspended solids, including iron and aluminum phosphates and double salts of iron and aluminum phosphates with phosphoric acid.

It is quite often necessary to concentrate the merchant-grade phosphoric acid to higher $P_2O_5$ values. Concentrating the 52 to 54% $P_2O_5$ acid to above 65% $P_2O_5$ molecular dehydration of the phosphoric acid and a change from the orthophosphate form to a more concentrated polyphosphate form. Occurring concurrently with the molecular dehydration of the acid is the charring of dissolved organic impurities at the high temperature required for concentration. The resultant product is a black superphosphoric acid solution containing a multitude of precipitated minute suspended contaminants which until concentration of the orthophosphoric acid to the polyphosphate form had been dissolved. These contaminants differ in nature from the suspended contaminants in merchant-grade acid in that these contaminants are almost entirely carbonaceous in nature. Although it would be highly advantageous to clarify the superphosphoric acid solution before its combination with other components, as in the manufacture of fertilizer solutions, a practicable process for so doing has not yet been devised.

Superphosphoric acid is used extensively in the manufacture of ammonium polyphosphate fertilizer solutions. Conventional methods for the preparation of ammonium polyphosphate utilize a two-step process involving concentration of wet process phosphoric acid and subsequent ammoniation. In a novel one-step process for the preparation of ammonium polyphosphate, the subject of copending application, Ser. No. 681,288, wet process phosphoric acid is ammoniated at high temperature in order to dehydrate and concurrently convert the orthophosphoric acid to ammonium polyphosphate. All these processes produce a black solution which renders the ammonium polyphosphate product less commercially acceptable than the clear ammonium polyphosphate solutions prepared when furnace grade rather than wet process phosphoric acid is used. It would be highly desirable to produce a clear ammonium polyphosphate solution utilizing less expensive wet process phosphoric acid in place of furnace grade phosphoric acid.

It is thus an object of this invention to prepare a clear ammonium polyphosphate solution from wet process phosphoric acid.

It is a further object of this invention to provide a new agent useful for clarifying ammonium polyphosphate solutions prepared from wet process phosphoric acid.

It is yet another object to provide a process for the clarification of ammonium polyphosphate solutions prepared from wet process phosphoric acid.

SUMMARY OF THE INVENTION

Contrary to what would be expected in light of the prior art, we have discovered that the addition of small quantities of aliphatic organic amine compounds to ammonium polyphosphate solutions produced from wet process superphosphoric acid and ammonia brings about a flotation of carbonaceous chars in a surface froth, and that the bulk of the carbonaceous material can thus be removed in the froth. By sparging air into the lower portion of the solution during agitation, the recovery of the carbonaceous material in the froth is increased.

DETAILED DESCRIPTION

Any suitable aliphatic organic amine may be used provided it is substantially insoluble in water. We have found amine residues, such as are obtained by the hydrogenation of nitrile pitch and being composed mainly of amines containing from 12 to 22 carbon atoms, to be particularly effective. Any suitable amine may be used alone or in admixture including, for example, primary amines which preferably have 12 to 22 carbon atoms including n-dodecyl amine, tridecyl amine, tetradecyl amine, pentadecyl amine, hexadecyl amine, heptadecyl amine, octadecyl amine, nonadecyl amine, licosyl amine, heneicosyl amine, docosyl amine and the like; secondary amines such as dihexyl amine, diheptyl amine, hexyl amine, heptyl amine, diocytyl amine, dibendecyl amine and the like; and tertiary amines such as tri-butyl amine, tri-hexyl amine, tri-octyl amine and the like.

The aliphatic organic amine is intimately admixed with the ammonium polyphosphate solution by the use of a strong agitator. In bench scale operations, we employ homogenizer-type apparatus, such as a Waring blender, Shear mixer, Cowles mixer, etc., and in pilot plant operation, we prefer to employ agitator apparatus, giving equivalent results. Air may be introduced into the solution by using an air sparger in the mix tank.

The aliphatic organic amine is preferably used in very small quantities in the range of about 0.1 to about 0.6 percent and above by weight, which amount will vary depending upon the amount of finely divided carbonaceous chars in the ammonium polyphosphate solution, etc. We prefer to use about 0.3 to 0.5 percent by weight of the amine.

The ammonium polyphosphate solutions which are treated with the amines in accordance with the invention have a pH above about 4.5 and preferably above about 5.0. The polyphosphate solutions contain from 10 to 80 percent by weight of the total $p_2O_5$ as nonorthophosphate. The ammonium polyphosphate solutions, for example a 10–34–0 fertilizer solution, are prepared by standard methods well known in the art. Generally speaking, the invention is applicable to any ammonium polyphosphate solution which contains carbonaceous solids.

After the agitating or mixing step, it is found that the bulk of the carbonaceous char is flocculated and rises rapidly to the surface in a froth, and the froth is separated from the underflow. To increase the recovery, the froth from the first flotation step may be diluted with water and refloated. By way of example, in the clarification of the ammonium polyphosphate solution 10–34–0 in the one-float process, approximately 83 percent of the $P_2O_5$ input was recovered as solids-free 10-34-0, while in the two-step float process, recovery was increased to 96 percent.

In the foregoing operation, the amine residue or other amine coats the carbonaceous solids, collects air bubbles, and rises to the surface in a froth. The froth may be diluted with water and again floated as described above, and the froth which contains $P_2O_5$ may be further treated to form a fertilizer product. If desired, the underflow which may contain a small amount of suspended solids may be filtered through filter cloth tied about the product outlet pipe. For such filtration, we have found Nylon, Dynel, cotton, and other fabrics to be very useful.

Specific examples illustrative of the invention may be set out as follows:

EXAMPLE I

Three-tenths percent by weight of amine residue consisting mainly of primary amines containing from 12 to 22 carbon atoms was added to 10-34-0 liquid fertilizer solution in the neutralization reactor discharge and mixed for a period of 5 to 60 minutes using shear mixing and air sparging. The 10-34-0 solution is prepared by standard ammoniation of 70 percent by weight $P_2O_5$ superphosphoric acid to a pH of about 6. The aerated 10-34-0 flowed to a separation tank where the solids floated to the surface after 1 to 2 hours' clarification. The clear underflow was polished by bag filtration and cooled to 120° F. in the product exchanger and sent to the storage. The froth was converted to 12-40-0 fertilizer.

EXAMPLE II

The operation was carried on as described in example I except that the froth from the No. 1 flotation step was diluted with water and refloated. The underflow from No. 2 flotation was returned to the main reactor as a dilute recycled stream. The froth from the No. 2 flotation was treated to form a complete hybrid fertilizer. In the first float process as described in example I, approximately 83 percent of the $P_2O_5$ input was recovered as solids-free 10-34-0. In the two-step float process described in this example, the recovery was increased to 96 percent and above.

EXAMPLE III

A comparison was made of the process in example I with a similar process employing Separan C-120. While there was a 50 percent recovery of clear 10-34-0 underflow after 5 minutes' clarification time in the procedure of example I and 80 percent recovery after two days' clarification, with Separan there was only a 25 percent recovery after two days' clarification.

EXAMPLE IV

In a bench scale operation, using a Waring blender for mixing 100 grams of 10-34-0 fertilizer solution of example I input and employing the two-float process described in example II, the following results were obtained and shown in table I.

TABLE I

| Run No. | Clear wt., gms. | Recovery $P_2O_5$, gms. | Float wt. gms., | Recovery $P_2O_5$ gms. | Net $P_2O_5$ recovery, percent |
|---|---|---|---|---|---|
| | | | 1st float | | |
| 2¹ | 81.2 | 27.0 | 18.8 | 5.9 | 82 |
| 4¹ | ²91.6 | 31.1 | 8.4 | 2.87 | (91.5) |
| | | | 2nd float | | |
| 2¹ | 15 | 4.5 | 3.8 | 1.4 | 96 |
| 4¹ | ²6.72 | 2.2 | 1.68 | 0.67 | 98 |

¹ 10-34-0 made from underflow of #2 float.
² Waring blender.

EXAMPLE V

The flotation process was carried out in a pilot plant using a 600-pound charge of 10-34-0 prepared as in example I. An air sparger was placed in the mixing tank. Amine residue, consisting of hydrogenated nitrile pitch and composed mainly of amines containing from 12 to 22 carbon atoms, was introduced in the amount of 0.5 percent. A recycle pump was also employed to provide better mixing and to increase air introduction. After a mixing period of 40 to 50 minutes, effective flotation was obtained in a single flotation step, and after 20 minutes recoveries of 60 to 69 % $P_2O_5$ were obtained. After 12 hours, recoveries up to 85 percent were obtained.

EXAMPLE VI

To 200 grams of 10-34-0 solution prepared as in example I at 75° F. was added 0.4 gram (0.2 percent) of amine residue. The mixture was agitated in a Waring blender for 30 seconds, then transferred to a graduated cylinder. After 2 hours, the clear volume was 50 percent; after 7 hours, 70 percent; and after 24 hours, 80 percent.

EXAMPLE VII

Using the procedure of example VI with blending at 120° F., the carbon flocculated and rose more rapidly. In 15 minutes, the clear volume was 50 percent. The final clear volume after 24 hours was 80 percent.

EXAMPLE VIII

The process is carried out as described in example I except that a primary amine is employed instead of amine residue.

EXAMPLE IX

The process as described in example I is carried out for the clarification of the fertilizer solution 6-18-6. This solution is first prepared from black 10-34-0 and then the flotation of the minute carbon particles accomplished.

EXAMPLE X

The process is carried out as described in example I except that the fertilizer solution is 7-21-7 and the minute carbon particles are floated in the manner described in example I.

EXAMPLE XI

Wet process merchant-grade phosphoric acid containing about 54% $P_2O_5$ was mixed with Dicalite Speed Plus filter aid and vacuum filtered through a medium porosity sintered glass funnel. The filtered solids-free acid was translucent, though still a deep brown color due to dissolved organic impurities. This acid contained no discrete solids. The acid was concentrated at atmospheric pressure until the temperature reached 271° C. and the weight loss indicated a concentration of 75.25% $P_2O_5$. This acid had a black color caused by a multitude of particles which had precipitated and charred during the concentration process. Four hundred seventy-two grams of this black acid were converted to 1,000 grams of 10-34-0 fertilizer solution by the addition of aqua ammonia in a stirred beaker at a temperature of 75° to 95° F. The ammoniated wet process phosphoric acid solution had a pH of 6.05 and a specific gravity of 1.385 at 68° F.

To 300 grams of this solution heated to 160° F. and placed in a Waring blender was added 1.5 grams (0.5 weight percent) of a mixture of aliphatic primary amines containing 12 to 22 carbon atoms. The mixture was stirred for 1 minute, then poured into a separatory tube. The solid matter floated at once leaving a clear green solution. Analysis of the filtered 54% $P_2O_5$ acid, unclarified ammoniated acid and amine clarified ammoniated acid were analyzed for total carbon and $P_2O_5$ with the following results.

TABLE II

| Material | $C/P_2O_5 \times 10^3$ |
|---|---|

| | |
|---|---|
| Filtered 54% P₂O₅ acid | 4.02 |
| Unclarified ammoniated acid | 2.44 |
| Amine clarified ammoniated acid | 0.69 |

This table shows that approximately half of the dissolved organic matter originally present in the filtered acid was oxidized to $CO_2$ during the concentration to superphosphoric acid. The bulk of the dissolved organic matter which was not oxidized and removed from the system as $CO_2$ was charred and converted to particulate carbonaceous matter which was separated by our procedure.

EXAMPLE XII

Wet process merchant-grade phosphoric acid containing about 54% $P_2O_5$ was diluted with water to a specific gravity of 1.385 at 68° F. To 300 grams of this acid heated to 160° F. and placed in a Waring blender was added 1.5 grams (0.5 weight percent) of a mixture of aliphatic primary amines containing 12 to 22 carbon atoms. The mixture was stirred for 1 minute, then poured into a separatory tube. The solid matter sank to the bottom of the tube. This shows that the solids obtained in example XI are different from those of this example in that, in solutions of equal density, the example XI solids floated while the example XII solid settled.

EXAMPLE XIII

The solids obtained in example XI by flotation from the ammoniated wet process phosphoric acid solution and the solids obtained in example XII from wet process phosphoric acid were each washed with three 100 ml. portions of hot water, transferred to tared porcelain crucibles and dried overnight at 120° C. The dried solids from example XI weighed 1.95 grams while the solids from example XII weighed 1.72 grams.

These solids were heated in a muffle furnace for 1 hour at 700° C. to determine the weight loss on ignition. On inspection, it was determined that the samples had not reached constant weight; heating was therefore continued for another hour at 750° C. to ensure complete oxidation of organic matter. The weight loss for the example XI (ammoniated) solids was 92.8 percent while the weight loss for the example XII (phosphoric acid) solids was 56.9 percent. These results show that the solids obtained by settling from wet process phosphoric acid are substantially different in nature compared to the solids obtained by flotation from ammoniated phosphoric acid. The former are in a major part inorganic while the latter are over 90 percent carbonaceous in nature.

EXAMPLE XIV

Wet process phosphoric acid is concentrated and ammoniated in a one-step process as disclosed in copending U.S. Pat. application, Ser. No. 681,288 to yield a 1-34-0 fertilizer solution. The ammoniated wet process phosphoric acid has a pH of 6.05 and a specific gravity of 1.385 at 68° F. To 300 grams of this solution heated to 160° F. and placed in a Waring blender, is added 1.5 grams (0.5 weight perCent) of a mixture of aliphatic primary amines containing 12 to 22 carbon atoms. The mixture is stirred for 1 minute, then poured into a separatory tube. Solid matter floats at once leaving a clear green solution.

The process described herein is effective for clarifying any solution where a part or all of the $P_2O_5$ therein is derived from superphosphoric acid. The problem arises in the case of solutions prepared from superphosphoric acid because it is the superphosphoric acid which contains finely divided carbonaceous materials which settle very slowly because of the high density and viscosity of the solution, and it will be understood that the solutions may comprise a very large number of fertilizer formulations. It will be further understood that in the clarification of such fertilizer solutions prepared from superphosphoric acid, primary, secondary and tertiary amines may be employed, best results being obtained by the use of amine residue as heretofore described.

While in the foregoing specification we have set out specific procedure in considerable detail for the purpose of illustrating embodiments of the invention, it will be understood that such detail or details may be varied widely by those skilled in the art without departing from the spirit of our invention.

We claim:

1. In a process for the removal of carbonaceous matter from ammoniated polyphosphate solutions wherein:
    said solutions contain from about 10 to about 80 percent by weight of the total $P_2O_5$ as nonorthophosphate,
    said solutions have a pH above about 4.5,
    said solutions are prepared by the molecular dehydration and subsequent or concurrent ammoniation of wet process phosphoric acid containing about 52 to 56% $P_2O_5$,
    said carbonaceous matter results from organic impurities in said wet process phosphoric acid,
    said carbonaceous matter chars during the molecular dehydration of said wet process orthophosphoric acid to superphosphoric acid, the steps of adding to the solution from about 0.1 to 0.6 percent by weight of a water insoluble aliphatic amine having a lower density than the ammoniated polyphosphate solution and immiscible therewith, agitating the mixture to bring said amine into intimate contact with the solution, holding the solution until the solids flocculate and float as a froth to the surface, and separating the froth from the underflow.

2. The process of claim 1 in which said ammoniated polyphosphate solution has a pH above about 5.0.

3. The process of claim 1 in which said amine is an amine residue containing 12 to 22 carbon atoms.

4. The process of claim 1 in which the froth is diluted with water and the mixture agitated and refloated.

5. The process of claim 1 in which air is added to the mixture during the agitation step.

6. The process of claim 1 in which said ammoniated polyphosphate solution is a 10-34-0 solution.

* * * * *